United States Patent
Kamiyama

(10) Patent No.: US 9,025,942 B2
(45) Date of Patent: May 5, 2015

(54) RADIANT HEATING DEVICE FOR VEHICLE

(75) Inventor: Naohisa Kamiyama, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 206 days.

(21) Appl. No.: 13/699,166

(22) PCT Filed: May 13, 2011

(86) PCT No.: PCT/JP2011/061052
§ 371 (c)(1),
(2), (4) Date: Nov. 20, 2012

(87) PCT Pub. No.: WO2011/152187
PCT Pub. Date: Dec. 8, 2011

(65) Prior Publication Data
US 2013/0068440 A1    Mar. 21, 2013

(30) Foreign Application Priority Data
May 31, 2010    (JP) .................................. 2010-124136

(51) Int. Cl.
| | |
|---|---|
| A45D 20/40 | (2006.01) |
| F24H 9/00 | (2006.01) |
| B60H 1/22 | (2006.01) |
| B60H 1/00 | (2006.01) |

(52) U.S. Cl.
CPC .......... *B60H 1/2218* (2013.01); *B60H 1/00849* (2013.01); *B60H 1/00878* (2013.01); *B60H 2001/00228* (2013.01)

(58) Field of Classification Search
None
See application file for complete search history.

(56) References Cited

U.S. PATENT DOCUMENTS

| | | | |
|---|---|---|---|
| 5,590,540 A | 1/1997 | Ikeda et al. | |
| 6,897,417 B1* | 5/2005 | Usselman et al. | 219/528 |
| 7,120,353 B2* | 10/2006 | Schaeffer et al. | 392/416 |
| 8,362,398 B2* | 1/2013 | Heiden et al. | 219/202 |
| 2007/0215589 A1* | 9/2007 | Berger | 219/202 |
| 2008/0046146 A1 | 2/2008 | Brekke et al. | |
| 2009/0289045 A1 | 11/2009 | Hotary | |
| 2009/0320416 A1 | 12/2009 | Tischhauser | |
| 2010/0176110 A1* | 7/2010 | Ogino et al. | 219/202 |

(Continued)

FOREIGN PATENT DOCUMENTS

| | | |
|---|---|---|
| DE | 35 32 492 A1 | 3/1987 |
| DE | 299 23 543 U1 | 3/2001 |

(Continued)

*Primary Examiner* — Thor Campbell
(74) *Attorney, Agent, or Firm* — Foley & Lardner LLP

(57) ABSTRACT

A radiant heating device for a vehicle includes a radiant heater that radiates radiant heat toward a passenger and is provided together with an air-conditioner that selectively introduces air outside a passenger compartment or air inside the passenger compartment and then supplies conditioned air generated from the introduced air into the passenger compartment. The radiant heating device includes a controller that differentiates a radiant energy amount of the radiant heater when the introduced air into the air-conditioner is the air outside the passenger compartment from when the introduced air is the air inside the passenger compartment. According to the radiant heating device, the passenger can be provided with warm comfort feeling both in an outside air intake mode and in an inside air intake mode of the air-conditioner.

15 Claims, 13 Drawing Sheets

(56) References Cited

U.S. PATENT DOCUMENTS

| | | | |
|---|---|---|---|
| 2010/0258645 A1 | 10/2010 | Hioki et al. | |
| 2011/0042988 A1* | 2/2011 | Alpert | 296/24.3 |
| 2011/0127246 A1* | 6/2011 | Heiden et al. | 219/202 |
| 2012/0267354 A1* | 10/2012 | Okamoto et al. | 219/202 |
| 2012/0292301 A1* | 11/2012 | Anzai et al. | 219/217 |
| 2013/0106147 A1* | 5/2013 | Lazanja et al. | 297/180.12 |
| 2013/0119042 A1* | 5/2013 | Eisenhour et al. | 219/202 |
| 2013/0334202 A1* | 12/2013 | Li et al. | 219/500 |
| 2014/0083672 A1* | 3/2014 | Rollinson et al. | 165/202 |
| 2014/0187140 A1* | 7/2014 | Lazanja et al. | 454/236 |

FOREIGN PATENT DOCUMENTS

| | | |
|---|---|---|
| EP | 0 214 517 B1 | 3/1987 |
| EP | 0 857 593 A2 | 8/1998 |
| JP | 2009-166828 A | 3/1987 |
| JP | 08-244443 A | 9/1996 |
| JP | 2008-254665 A | 9/1996 |
| JP | 2006-224813 A | 8/2006 |
| JP | 2008-006955 A | 1/2008 |
| JP | 2009-067224 A | 4/2009 |
| JP | 2009-178247 A | 8/2009 |
| WO | WO 2009/075063 A1 | 6/2009 |

* cited by examiner

— FOR INPUT PATTERN A
---- FOR INPUT PATTERN B

— FOR INPUT PATTERN A
---- FOR INPUT PATTERN B

RADIANT HEATING DEVICE FOR VEHICLE

TECHNICAL FIELD

The present invention relates to a radiant heating device for a vehicle that heats passengers using radiant heat.

BACKGROUND ART

As a radiant heating device for a vehicle, ones disclosed in Patent Documents 1 and 2 listed below are known.

A radiant heating device 100 disclosed in the Patent Document 1 includes, as shown in FIG. 14, a radiant heater 102 disposed on a back face of a seatback 101, and a reflector 103 disposed so as to surrounding the radiant heater 102. Radiant heat from the radiant heater 102 is radiated to lower legs a of a rear-seat passenger A directly and after reflected by the reflector 103.

A radiant heating device 110 disclosed in the Patent Document 2 includes, as shown in FIG. 15, a pair of radiant heaters 112 disposed below an instrument panel 111 and on left and right sides of a driver's seat, and reflectors 113 each disposed so as to surround a half of each circumference of the radiant heaters 112. Radiant heat from the radiant heaters 112 is radiated to a driver's foot space b directly and after reflected by the reflectors 113.

A radiant heating device is utilizes as a supplemental heating unit of a blower-type air-conditioner. In an air-conditioner, air outside a passenger compartment (outside air) or air inside a passenger compartment (inside air) is introduced into the air-conditioner, and then supplied to the passenger compartment after conditioned to be desired-temperature conditioned air in an air-conditioning unit.

PRIOR ART DOCUMENT

Patent Documents

Patent Document 1: Japanese Patent application Laid-Open No. 2008-6955
Patent Document 2: Japanese Patent application Laid-Open No. 2006-224813

SUMMARY OF INVENTION

However, the heated air blown to the passenger compartment flows as shown by an arrow in FIG. 16 in an outside intake mode, and flows as shown by an arrow in FIG. 17 in an inside intake mode. Therefore, temperature sensible by a driver is different between the outside air intake mode and the inside air intake mode due to a difference of flows of the heated air and so on. As a result, it is not always true that the driver can feel warm comfort by operating a radiant heating device with identical radiant energy in both of the air intake modes.

Especially, as shown in FIGS. 16 and 17, the flows of the heated air around the rear-seat passenger A are much different from each other in both of the air intake modes, so that the rear seat passenger A may not feel warm comfort even if the radiant heater 112 radiates identical radiant heat.

Therefore, an object of the present invention is to provide a radiant heating device for a vehicle that can provide warm comfort to a passenger in both of an outside air intake mode and an inside air intake mode of a blower-type air-conditioner.

An aspect of the present invention provides A radiant heating device for a vehicle that includes a radiant heater that radiates radiant heat toward a passenger and is provided together with an air-conditioner that selectively introduces air outside a passenger compartment or air inside the passenger compartment and then supplies conditioned air generated from the introduced air into the passenger compartment, wherein the radiant heating device includes a controller that differentiates a radiant energy amount of the radiant heater when the introduced air into the air-conditioner is the air outside the passenger compartment from when the introduced air is the air inside the passenger compartment.

According to the radiant heating device, the radiant energy amount of the radiant heater can be set so as to obtain desired warm feeling when the air-conditioner introduces air outside a passenger compartment (an outside air intake mode) and when introduces air inside a passenger compartment (an inside air intake mode), so that the passenger can be provided with warm comfort feeling both in the outside air intake mode and in the inside air intake mode of the air-conditioner.

Here, it is preferable that the radiant heater includes a plurality of heating sections that radiate heat toward regions of the passenger, respectively.

Further, it is preferable that the controller adjusts radiant energy amounts of the plurality of heating sections between when the introduced air into the air-conditioner is the air outside the passenger compartment and when the introduced air is the air inside the passenger compartment.

Furthermore, it is preferable that one of the plurality of heating sections radiate radiant heat toward any of knees, calves and thighs of the passenger.

Alternatively, it is preferable that the plurality of heating sections radiate radiant heat toward thighs, knees, shins, toes, calves, heels, a thigh-sideface and a ankle-sideface of the passenger, respectively.

In addition, it is preferable that the radiant heater radiates radiant heat toward the passenger on a rear seat.

In addition, it is preferable that the radiant heating device further includes an operational panel for operating the radiant heater.

In addition, it is preferable that the operational panel includes an adjustment switch for adjusting a radiant energy amount of the radiant heater.

Alternatively, it is preferable that the operational panel includes a switch for setting a radiant energy amount of the radiant heater to maximum.

In addition, it is preferable that the air-conditioner is capable of operating a normal heating operation and an economical heating operation, and the controller, in the economical heating operation, operates the radiant heater when a passenger is seated on a rear seat, and doesn't operate the radiant heater when no passenger is seated on a rear seat.

In addition, it is preferable that the controller controls a radiant energy amount of the radiant heater by a pulse width modulation control.

In addition, it is preferable that the radiant heater includes a plurality of electric heating wires having different patterns, and the controller adjusts a radiant energy amount of the radiant heater by changing over energization to the electric heating wires.

DESCRIPTION OF EMBODIMENTS

First Embodiment

A first embodiment will be explained with reference to FIGS. 1 to 9. An air conditioning system for a vehicle includes a blower-type air-conditioner 1 and a radiant heating device 10 for a vehicle.

Figure 8:
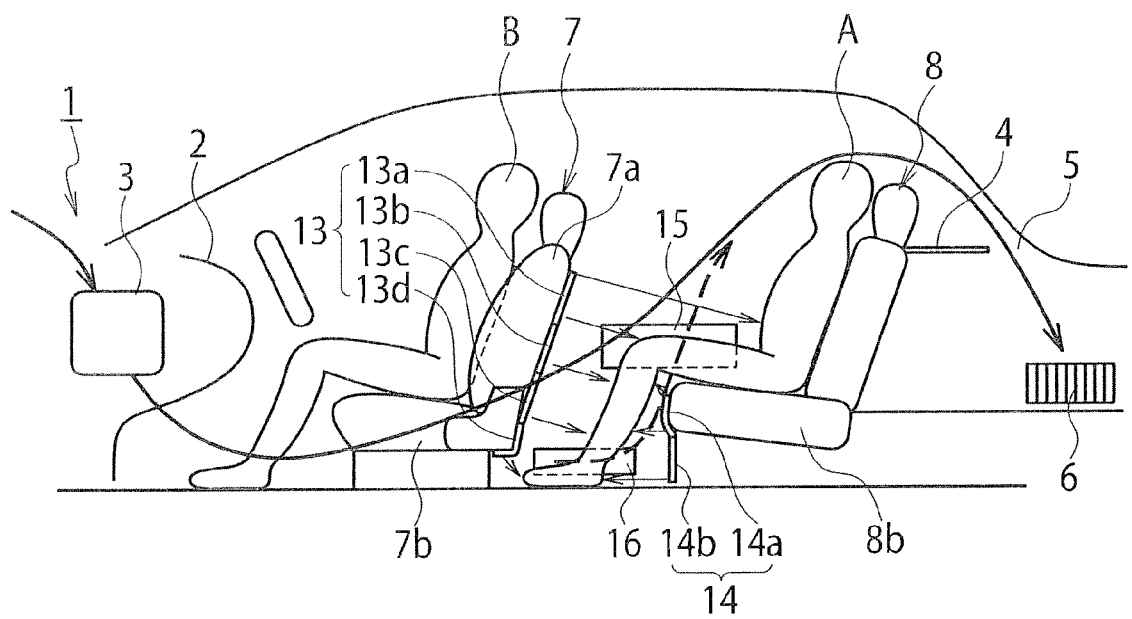
FIG. 8 It is a side view showing a heated airflow in an outside air intake mode in the first embodiment.
Figure 9:
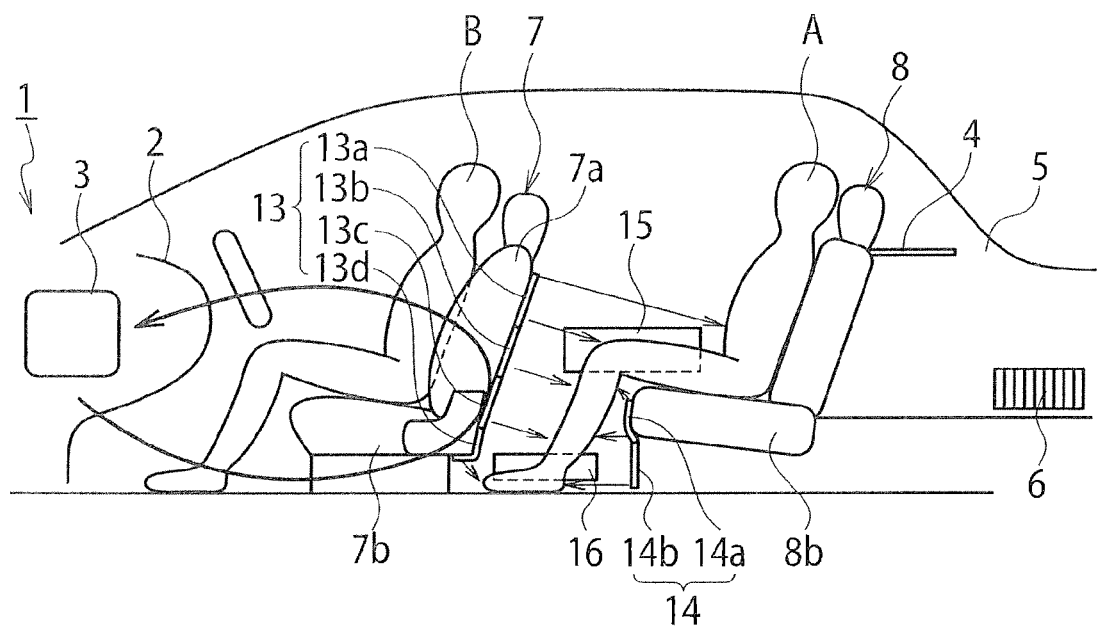
FIG. 9 It is a side view showing a heated airflow in an inside air intake mode in the first embodiment.

The air-conditioner 1 includes an air-conditioner unit 3 in an inside of a center console panel 2 (see FIGS. 8 and 9). The air-conditioner unit 3 is provided with an outside air intake port and an inside air intake port (not shown). The air-conditioner unit 3 is provided with an intake door (not shown) that can selectively open the outside air intake port and the inside air intake port. Air outside a passenger compartment (outside air) or air inside a passenger compartment (inside air) can be selectively introduced into the air-conditioner unit 3 according to a position of the intake door.

In the air-conditioner unit 3, a blower, an evaporator and a heater are disposed sequentially from upstream to downstream along an introduced airflow. Outside air or inside air is introduced into the air-conditioner unit 3 due to suction by the blower. The air (the outside air or the inside air) introduced into the sir-conditioner unit 3 is made to desired-temperature conditioned air (heated air or cooled air) by being cooled by the evaporator and/or heated by the heater. The desired-temperature conditioned air is blown out from an outlet port(s) (not shown) provided at a foreside in the passenger compartment. In addition, a drafter inlet 5 is disposed on a rear parcel 4 in the passenger compartment, and a drafter outlet(s) 6 is disposed in a trunk room (see FIG. 2).

Figure 1:
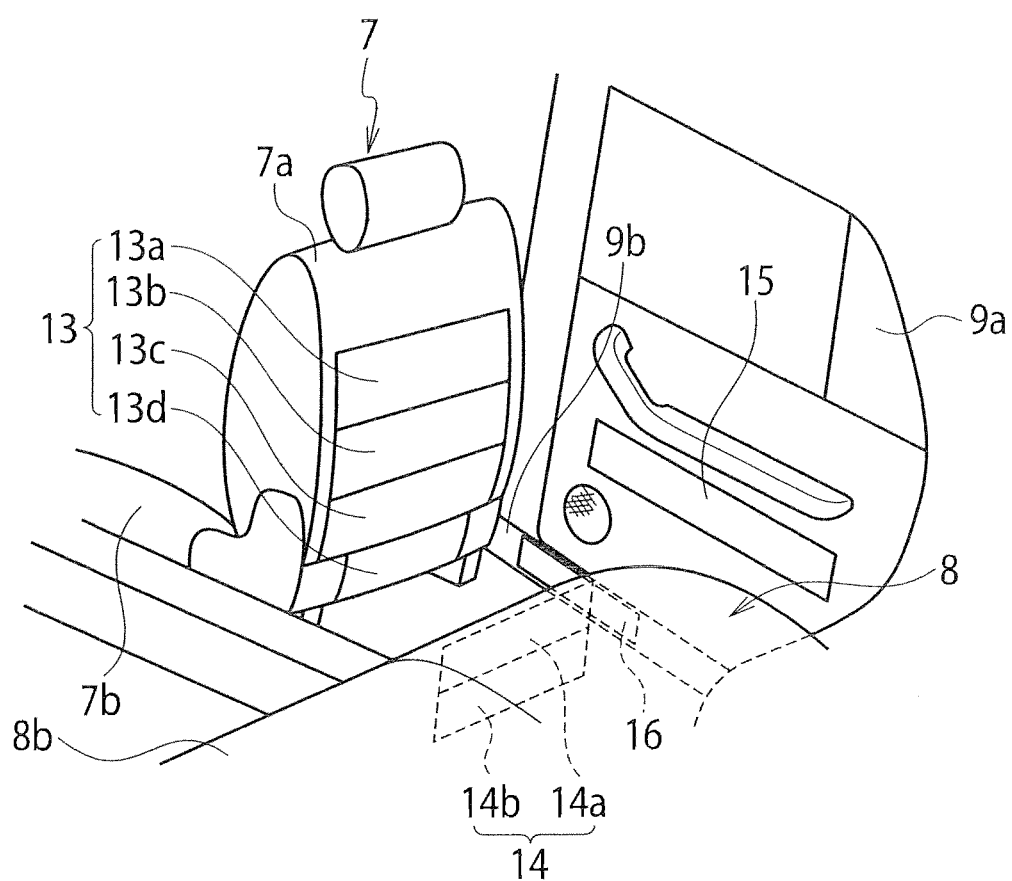
FIG. 1 It is a perspective view of a main portion of a passenger compartment showing an installed state of a radiant heater in a first embodiment.
Figure 2:
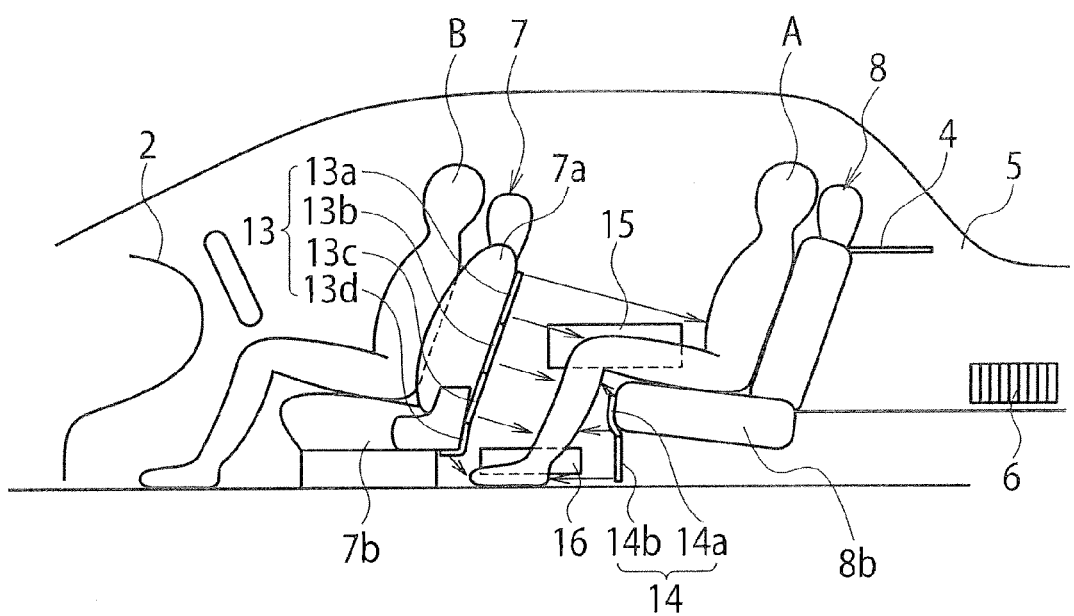
FIG. 2 It is a side view of an inside of the passenger compartment showing the installed state of the radiant heater.

The radiant heating device 10 includes, as shown in FIGS. 1 and 2, two radiant heaters 11 (see FIG. 6) for left and right rear seats, two operational panels 30 (see FIG. 5), and a controller 40 (see FIG. 6) that controls the radiant heaters 11 based on inputs to the operational panels 30.

Each of the radiant heaters 11 is configured of first to fourth electric heating pads 13 to 16. The first electric pad 13 is disposed on a back face of a seatback 7a and a seat cushion 7b of a front seat 7. The second electric heating pad 14 is disposed on a front face of a seat cushion 8b of a rear seat 8. The third electric heating pad 15 is disposed on an interior face of a door 9a. The fourth electric heating pad 16 is disposed on an interior face of a side sill 9b.

The first electric heating pad 13 includes heating sections 13a to 13d vertically divided into four segments. The four heating sections 13a to 13d are a heating section for thigh 13a, a heating section for knee 13b, a heating section for shin 13b, and a heating section for toe 13d sequentially from the top. The heating sections 13a to 13d radiate radiant heat to regions of a passenger A on the rear seat 8, respectively. The second electric heating pad 14 includes heating sections 14a and 14b vertically divided into two segments. An upper one of the two is a heating section for calf 14a, and a lower one is a heating section for heel 14b. The heating sections 14a and 14b radiate radiant heat to regions of the passenger A on the rear seat 8, respectively. The third heating pad 15 is a heating section for thigh-sideface 15 as a whole, and radiates radiant heat to a side face of thigh of the passenger A on the rear seat 8. The fourth heating pad 16 is a heating section for ankle-sideface 16 as a whole, and radiates radiant heat to a side face of ankle of the passenger A on the rear seat 8.

Figure 3:
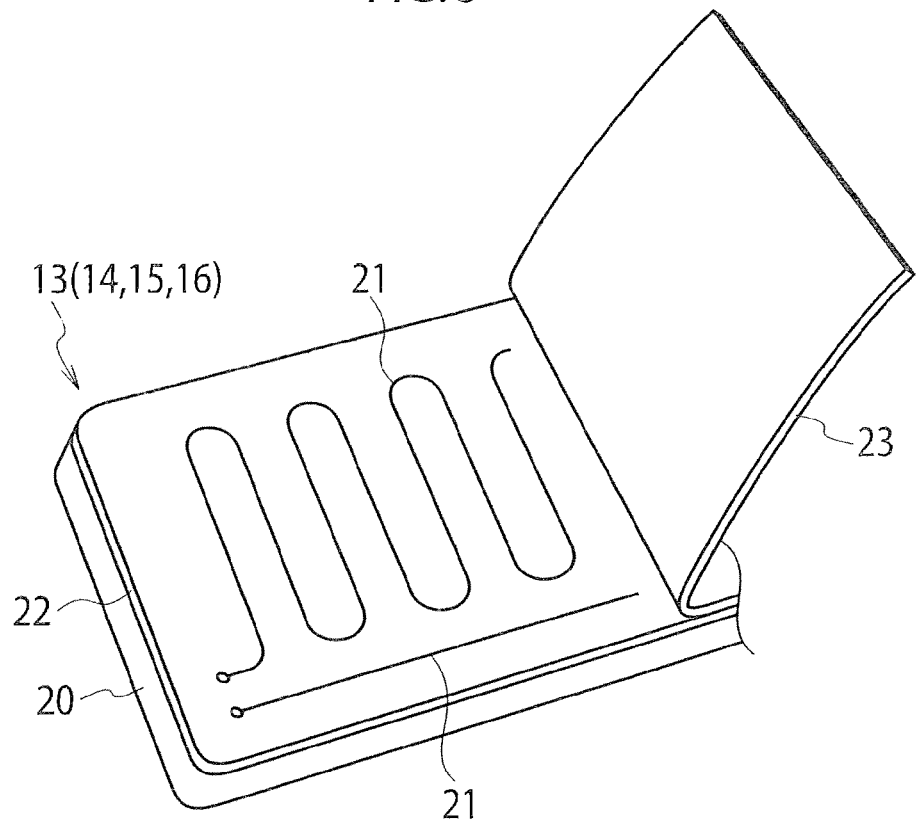
FIG. 3 It is a perspective view of a radiant heat pad.
Figure 4:
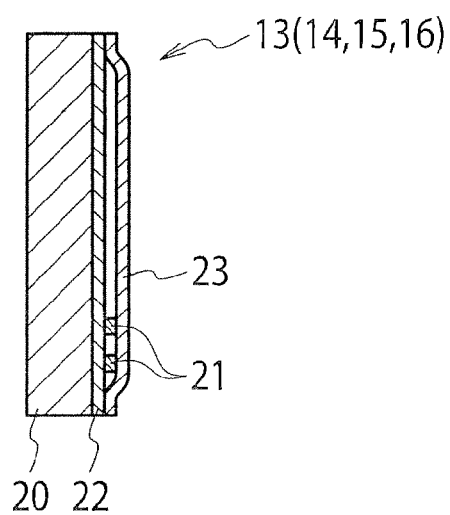
FIG. 4 It is a cross-sectional view of the radiant heat pad.

Each of the electric heating pads 13 to 16 has, as shown in FIGS. 3 and 4, a layered structure composed of a thermal insulator 20, a felt 21 on which electric heating wires 21 are patterned, and a surface skin 23. The electric heating wires 21 are patterned with meandering lines. The electric heating wires 21 are wired independently in each of the heater sections 13a to 13d, 14a and 14b, 15 and 16. For example, in the first electric heating pad 13, the electric heating wires 21 are sectioned into four, and the heating sections 13a to 13d can be independently energized.

Figure 5:
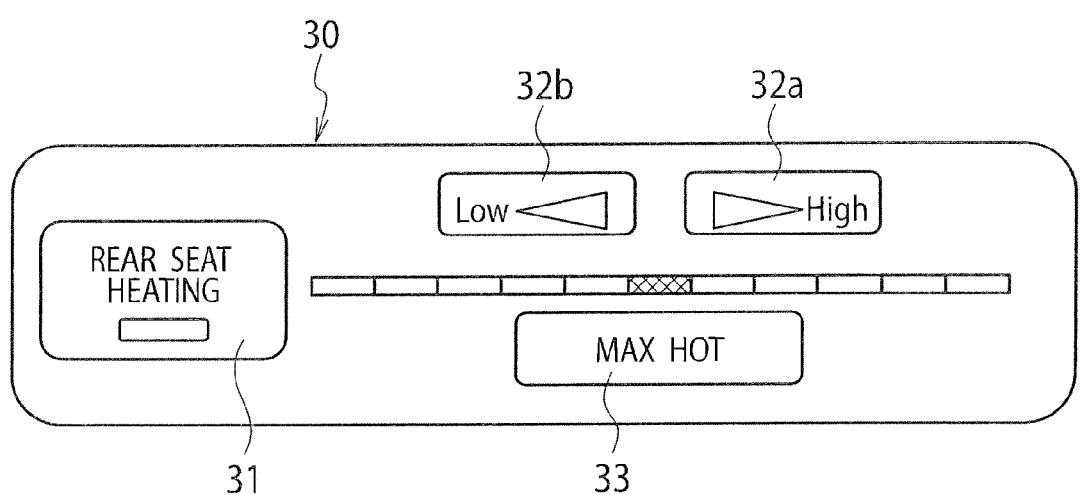
FIG. 5 It is a front view of an operational panel in the first embodiment.

The two operational panels 30 are disposed on a center console (not shown) on a side of rear seats. Each of the operational panels 30 includes, as shown in FIG. 5, a rear seat heating switch 31, two adjustment switches 32a and 32b, and a MAX HOT switch 33. The radiant heating device 10 is turned on or off by the rear seat heating switch 31. A radiant energy amount of the radiant heating device 10 is adjusted (turning up or down of temperature) by the two adjustment switches 32a and 32b. The temperature adjustment can be set according to five levels. A radiant energy amount of the radiant heating device 10 is set to maximum by the MAX HOT switch 33.

Figure 6:
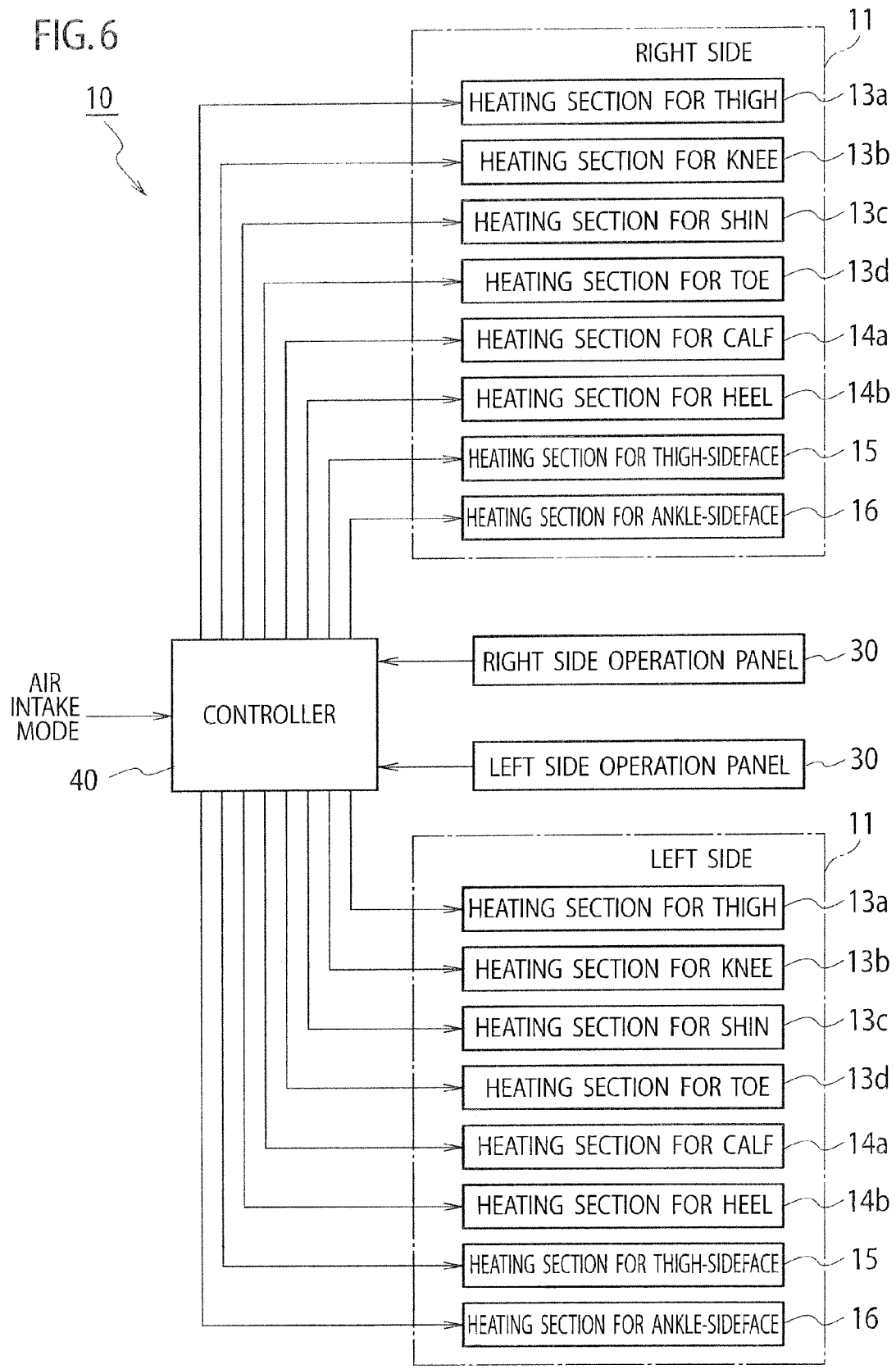
FIG. 6 It is a block diagram of a radiant heating device according to the first embodiment.
Figure 7:
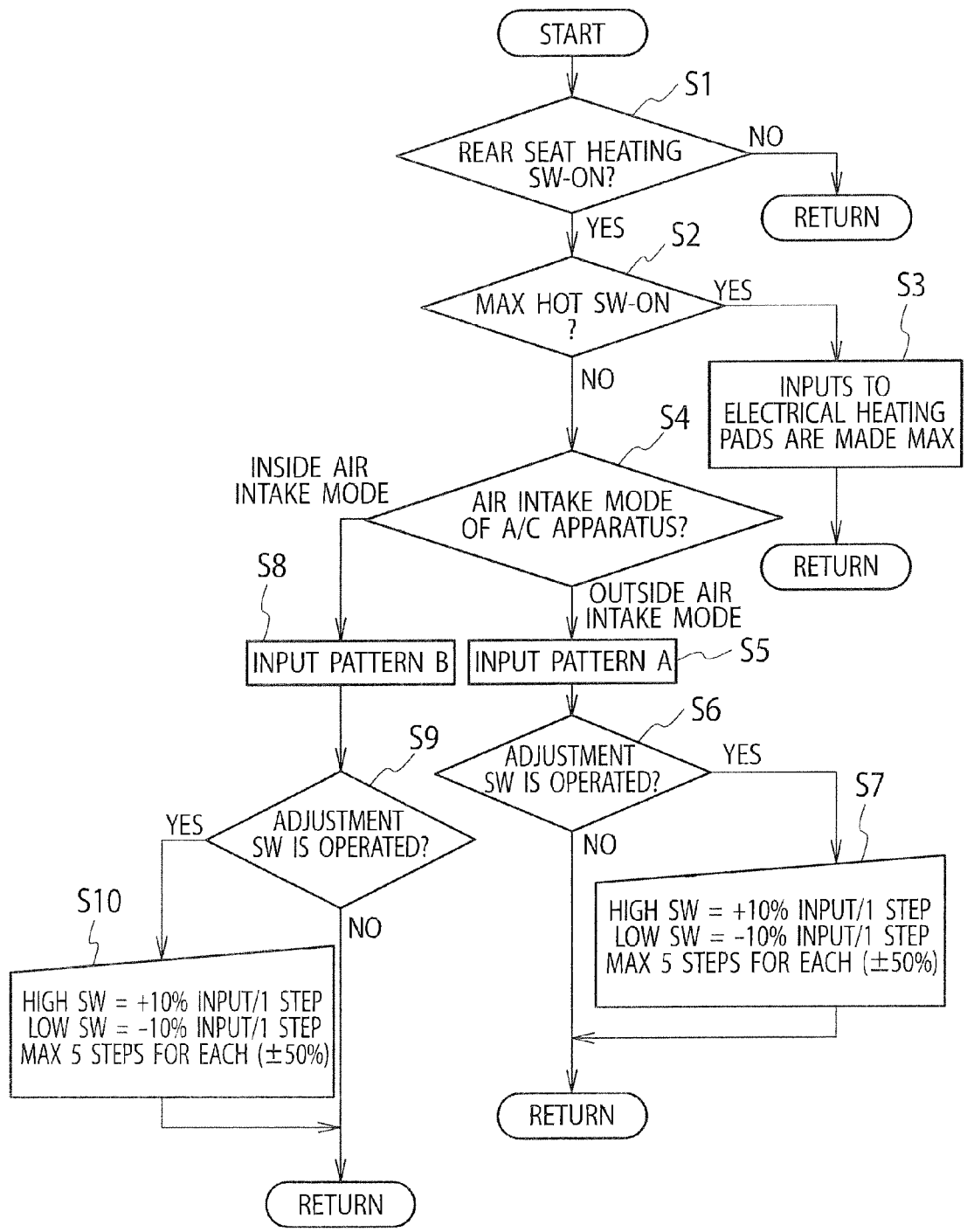
FIG. 7 It is a flowchart showing operations of the radiant heating device according to the first embodiment.

Next, a control system of the radiant heating device 10 will be explained. As shown in FIG. 6, Operational data to the two operational panels 30 are input to the controller 40 along with setting data of an air intake mode (the outside air intake mode or the inside air intake mode) of the air-conditioner 1. An energization pattern of the heating segment 13a to 16 for the outside air intake mode (pattern A) and an energization pattern of the heating segment 13a to 16 for the inside air intake mode (pattern B) are implemented in the controller 40 as map data. As shown in [Table 1] below, the map data stores energizing power amounts for the heating sections 13a to 16 to provide desired warm feeling in the outside air intake mode and the inside air intake mode. There values are preliminarily set based on experimental data.

TABLE 1

|  | PATTERN A (OUTSIDE AIR INTAKE MODE) | PATTERN B (INSIDE AIR INTAKE MODE) |
| --- | --- | --- |
| HEATING SECTION FOR THIGH | 21 | 16 |
| HEATING SECTION FOR KNEE | 8 | 22 |
| HEATING SECTION FOR SHIN | 20 | 19 |
| HEATING SECTION FOR TOE | 22 | 23 |
| HEATING SECTION FOR CALF | 17 | 8 |
| HEATING SECTION FOR HEEL | 15 | 22 |
| HEATING SECTION FOR THIGH-SIDEFACE | 9 | 9 |
| HEATING SECTION FOR ANKLE-SIDEFACE | 8 | 8 |

Next, controls of the radiant heating device 10 will be explained. The controller 40 controls the radiant heaters 11 the left and right rear seats 8 based on processes shown in a flowchart in FIG. 7. In detail, energization of the heating sections 13a to 16 of each of the radiant heaters 11 is independently controlled by a PWM (pulse width modulation) control. Note that only one of the two radiant heaters 11 for the left and right rear seats 8 will be explained hereinafter. However, another is also controlled similarly to the one, but independently from the one.

First, when the rear seat heating switch 31 is turned on (YES in step S1), it is judged whether or not the MAX HOT switch 33 is being turned on (step S2). If the MAX HOT switch 33 is being turned on (YES in step S2), maximum energizing powers are supplied to the first to fourth electric heating pads 13 to 16 (step S3). On the other hand, if the MAX HOT switch 33 is being turned off (NO in step S2), the air intake mode of the air-conditioner 1 is judged (step S4).

If in the outside air intake mode, energizing powers for the input pattern A are supplied to the heater sections 13a to 16 (step S5). During the energization with the input pattern A, an operation to the adjustment switch 32a or 32b is always monitored (step S6). If the adjustment switch 32a or 32b is operated during the energization with the input pattern A (YES in step S6), a radiant energy amount is increased or decreased by 10% per one level of turning up or down of temperature (step S7).

On the other hand, if in the inside air intake mode, energizing powers for the input pattern B are supplied to the heater sections 13a to 16 (step S8). During the energization with the input pattern B, an operation to the adjustment switch 32a or 32b is always monitored (step S9). If the adjustment switch 32a or 32b is operated during the energization with the input pattern B (YES in step S9), a radiant energy amount is increased or decreased by 10% per one level of turning up or down of temperature (step S10).

When the air-conditioner 1 is operated in its heating operation with the outside air intake mode, as show in FIG. 8, outside air is introduced in the air-conditioner unit 3, and heated air is generated from the introduced outside air and blown out into a passenger compartment. The heated air blown out into the passenger compartment flows from front seats 7 to rear seats 8, and ejected out to the outside of the vehicle from the drafter outlet(s) 6 via the drafter inlet 5. On the other hand, with the inside air intake mode, as shown in FIG. 9, inside air is introduced in the air-conditioner unit 3, and heated air is generated from the introduced inside air and blown out into a passenger compartment. The heated air blown out into the passenger compartment is retuned and suctioned into the air-conditioner unit 3 before it sufficiently reaches to the rear seats 8. Therefore, temperature sensible by a passenger A on the rear seat 8 is different between the outside air intake mode and the inside air intake mode of the air-conditioner 1 due to a difference of flows of the heated air and so on.

If the radiant heating device 10 is operated in the heating operation of the air-conditioner 1 like this, radiant energy that can provide desired warm feeling in each of the air intake modes is radiated to the passenger(s) A on the rear seat(s) 8 from the radiant heater(s) 11. As a result, it becomes possible to provide warm comfort feeling to the passenger A on the rear seat 8 both in the outside air intake mode and in the inside air intake mode.

Since the radiant heater 11 includes plural heating sections 13a to 16 for radiating plural regions of the passenger A, respectively, finely-tuned heating can be made and thereby feeling of warm comfort can be improved.

Radiant energy of the plural heating sections 13a to 16 is independently adjustable, radiant energy amounts of heating sections 13a to 16 are adjusted in the inside air intake mode and in the outside air intake mode, respectively. Since warm feeling by the air-conditioner 1 for each of regions of a lower body is different between in the outside air intake mode and in the inside air intake mode, the passenger A can feel improved warm comfort through supplemental heating according to the regions by using the radiant heating device 10.

One of the plural heating sections 13a to 16 is the heating section for knee 13b that radiates heat toward knees of the passenger A on the rear seat 8. Although the heated air from the air-conditioner 1 flows through circumference of the knees of the passenger A in the outside air intake mode, but doesn't flow through the circumference of the knees of the passenger A in the inside air intake mode. Therefore, the radiant energy toward the knees of the passenger A is set low in the outside air intake mode and set high in the inside air intake mode, so that warm comfort feeling for knee can be provided in the both air intake modes.

One of the plural heating sections 13a to 16 is the heating section for calf 14a that radiates heat toward calves of the passenger A on the rear seat 8. The heated air from the air-conditioner 1 flows through circumference of the knees of the passenger A and then flows upward in the outside air intake mode, and cool air near a floor surface is drawn by this flow of the heated air and thereby flows through circumference of the calves of the passenger A (see a dashed arrow in FIG. 8). On the other hand, the heated air from the air-conditioner 1 flows through circumference of the knees of the passenger A but doesn't flows upward in the inside air intake mode, so that cool air near a floor surface is not drawn upward and doesn't flow through circumference of the calves of the passenger A. Therefore, the radiant energy toward the calves of the passenger A is set high in the outside air intake mode and set low in the inside air intake mode, so that warm comfort feeling for calves can be provided in the both air intake modes.

One of the plural heating sections 13a to 16 is the heating section for thigh 13a that radiates heat toward thighs of the passenger A on the rear seat 8. The heated air from the air-conditioner 1 flows through circumference of the knees of the passenger A and then flows upward in the outside air intake mode, and cool air near a floor surface is drawn by this flow of the heated air and thereby flows through circumference of the thighs of the passenger A (see a dashed arrow in FIG. 8). On the other hand, the heated air from the air-conditioner 1 flows through circumference of the knees of the passenger A but doesn't flows upward in the inside air intake mode, so that cool air near a floor surface is not drawn upward and doesn't flow through circumference of the thighs of the passenger A. Therefore, the radiant energy toward the thighs of the passenger A is set high in the outside air intake mode and set low in the inside air intake mode, so that warm comfort feeling for thighs can be provided in the both air intake modes.

The plural heating sections 13a to 16 radiate heat toward thighs, knees, shins, toes, calves, heels, a thigh-sideface and a ankle-sideface of a passenger A on the rear seat 8, respectively. Therefore, since it can perform a heating operation appropriate to the regions (thighs, knees, shins, toes, calves, heels, a thigh-sideface and a ankle-sideface) of a lower body of the passenger A in the outside air intake mode and in the inside air intake mode, warm comfort feeling can be improved.

The radiant heater 11 is configured to radiate heat toward a passenger A on the rear seat 8. A passenger B on the front seat 7 can get heating by the air-conditioner 1 sufficiently. On the other hand, the passenger A on the rear seat 8 cannot always get heating by the air-conditioner 1 sufficiently, but can get radiant heat from the radiant heater 11. Therefore, it can be possible to provide warm comfort feeling to both of the passengers A and B on the front seat(s) 7 and the rear seat(s) 8.

As shown in a [Table 2] below, comfort (for a whole body and a lower body) experiments for a passenger A on the rear seat 8 were made with the radiant heater operated and not-operated under a condition where the air-conditioner 1 was operated so as to provide comfort feeling to a passenger B on the front seat 7 in the outside air intake mode. In the experiments, several people evaluated comfort with point ratings as a passenger A on the rear seat 8, and an averaged value is calculated. The point ratings for the comfort evaluation were "very hot"=+3, "hot"=+2, "slightly hot"=+1, "appropriate"=0, "slightly cold"=−1, "cold"=−2, and "very cold"=−3. According to results of the experiments, passengers A on the rear seat 8 felt "slightly cold" for a whole body and a lower body when the radiant heater 11 is not operated. On the other hand, the passengers A on the rear seat 8 felt comfort intermediate between "slightly hot" and "appropriate" for a whole body and a lower body when the radiant heater 11 is operated. Namely, the radiant heating device 10 improves comfort in the outside air intake mode for a passenger A on the rear seat 8 (and passengers B on the front seat 7 also felt appropriate comfort).

TABLE 2

| RADIANT HEATER | | TURNED ON | TURNED OFF |
|---|---|---|---|
| COMFORT EVALUATION FOR REAR SEAT | WHOLE BODY COMFORT | −1 | 0.5 |
| | LOWER BODY COMFORT | −1 | 0.5 |

As shown in a [Table 3] below, experiments were made also in the inside air intake mode similarly to the above experiments in the outside air intake mode. According to results of the experiments, passengers A on the ear seat 8 felt "slightly cold" for a whole body and "cold" for a lower body when the radiant heater 11 is not operated. On the other hand, the passengers A on the rear seat 8 felt "appropriate" for a whole body and a lower body when the radiant heater 11 is operated. Namely, the radiant heating device 10 improves comfort in the inside air intake mode for a passenger A on the rear seat 8 (and passengers B on the front seat 7 also felt appropriate comfort).

TABLE 3

| RADIANT HEATER | | TURNED ON | TURNED OFF |
|---|---|---|---|
| COMFORT EVALUATION FOR REAR SEAT | WHOLE BODY COMFORT | −1 | 0 |
| | LOWER BODY COMFORT | −2 | 0 |

As explained above, the radiant heating device 10 includes the operational panels 30 for the radiant heaters 11. Therefore, since an operational setting can be changed according to a passenger A, a heating operation preferable for the passenger A can be done.

The operational panel(s) 30 includes the adjustment switches 32a and 32b for adjusting a radiant energy amount of the radiant heater 11. Although warm comfort that a passenger A on the rear seat 8 feels may varies from person to person even in the same temperature, the passenger A can operate preferable heating by the adjustment switches 32a and 32b.

In addition, the operational panel(s) 30 also includes the MAX HOT switch 33 for setting a radiant energy amount of the radiant heater 11 to maximum. Therefore, a passenger A on the rear seat 8 can operate a heating operation for quickly heating the inside of the passenger compartment.

As explained above, a radiant energy amount of the radiant heater 11 is controlled with a PWM control. Therefore, the radiant energy amount of the radiant heater 11 can be changed and adjusted.

Second Embodiment

Figure 10:
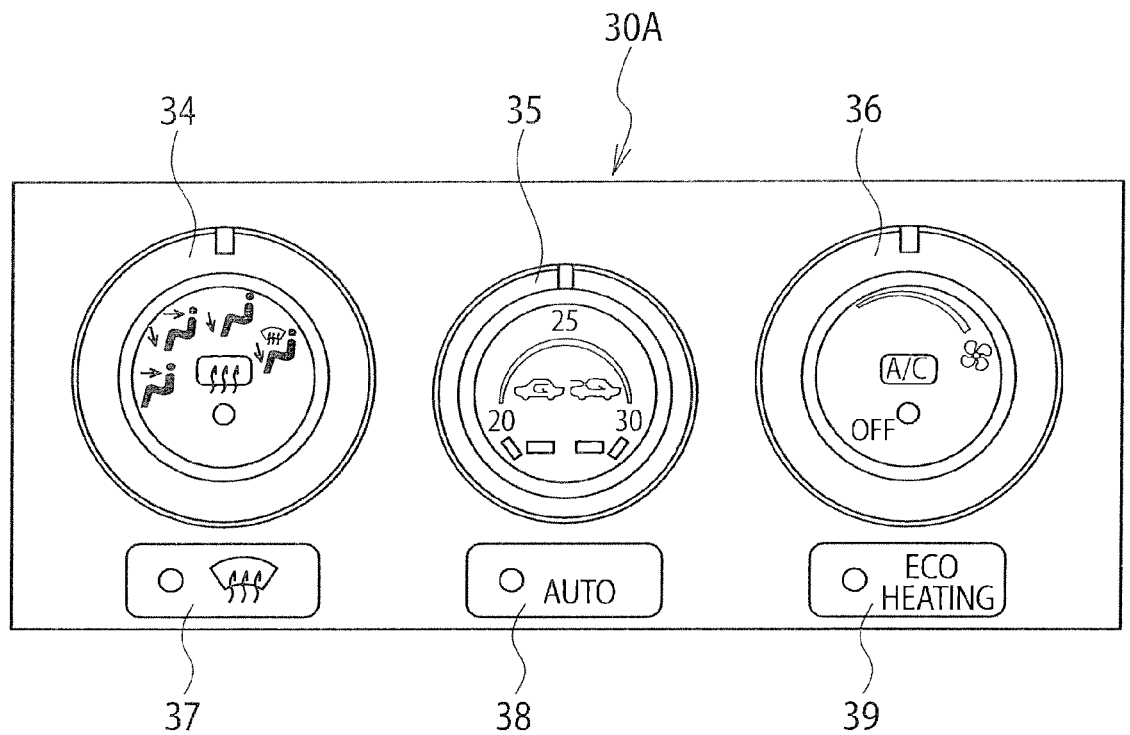
FIG. 10 It is a front view of an operational panel in a second embodiment.
Figure 11:
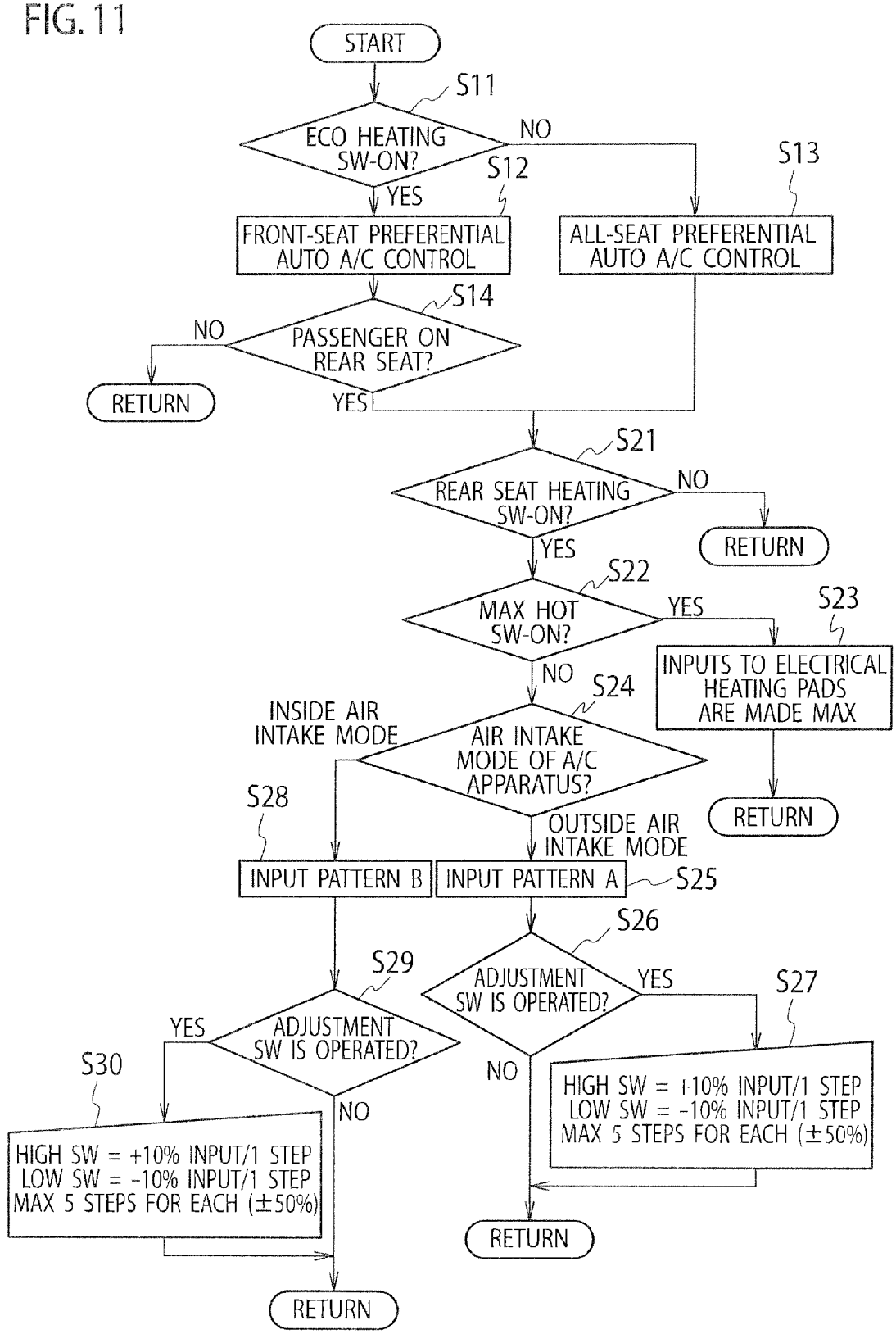
FIG. 11 It is a flowchart showing operations of a radiant heating device according to the second embodiment.

A second embodiment will be explained with reference to FIGS. 10 and 11. An air-conditioning system for a vehicle in the present embodiment has almost the same configurations as those of the system in the above first embodiment. Therefore, its identical or similar constituent elements are labeled with identical numerals and their redundant explanations will be omitted.

An air-conditioning system in the present embodiment includes, similarly to the above first embodiment, a blower-type air-conditioner 1 and a radiant heating device 10 for a vehicle, but the air-conditioner 1 can perform an economical heating operation in addition to a normal heating operation. Therefore, as shown in FIG. 10, an economical heating switch 39 is provided on a main operational panel 30A of the air-conditioner 1 disposed on the center console panel 2 in addition to an air-blow mode switch 34, an intake mode selection/temperature set switch 35, an air volume switch 36, a defroster switch 37, and an auto mode switch 38. Note that the economical heating operation can be operated only when the air-conditioning system is operated in its auto mode.

In addition, seat occupant sensors (not shown) each detects whether or not a passenger A is seated thereon are is installed in the left and right rear seats 8 in addition to the operational panels 30. Data detected by the seat occupant sensors are input to the controller 40 of the radiant heating device 10 together with air intake mode data (the outside air intake mode or the inside air intake mode) of the air-conditioner 1 and operational data of the operational panels 30.

Next, controls of the radiant heating device 10 will be explained. The controller 40 controls the radiant heaters 11 for the left and right rear seats 8 based on processes shown in a flowchart in FIG. 11. Also in the present embodiment, only one of the two radiant heaters 11 for the left and right rear seats 8 will be explained.

First, it is judged whether or not the economical heating switch 39 is being turned on in the auto mode (the auto switch 38 is being turned on) (step S11). If the economical heating switch 39 is being turned off (NO in step S11), an all-seat preferential air-conditioning control (normal heating operation) is operated (step S13). In the all-seat preferential auto air-conditioning control, a heating operation that takes into account the rear seats 8 in addition to the front seats 7 is operated regardless of whether or not a passenger(s) A seats on the rear seat(s) 8. Specifically, the radiant heating device 10 is controlled based on operated states of the operational panels 30 similarly to the above first embodiment (steps S21 to S30). Explanations of controls in the steps S21 to S30 after the step S13 are omitted, because they are identical to controls in the steps S1 to S10 in the above first embodiment.

On the other hand, if the economical heating switch 39 is being turned on (YES in step S11), a front-seat preferential auto air-conditioning control (economical heating operation) is operated (step S12). In the front-seat preferential auto air-conditioning control, it is firstly judged whether or not a passenger A is seated on the rear seat 8 (step S14). If no passenger A is seated on the rear seat 8 (NO in step S14), it is not needed to operate the radiant heaters 11 of the radiant heating device 10 and thereby the all-seat preferential heating operation that takes into account only the front seats 7 is operated without operating the radiant heaters 11. Namely, the control in the step S12 (the front-seat preferential auto air-conditioning control) is processed only by the air-conditioner 1 and the radiant heating device 11 is not operated in a case where the step S14 is disaffirmed, so that it saves energy (becomes economical).

On the other hand, if a passenger A is seated on the rear seat 8 (YES in step S14), the radiant heating device 10 is controlled based on operated states of the operational panels 30 similarly to the above first embodiment (steps S21 to S30). Explanations of controls in the steps S21 to S30 after the affirmation of the step S13 are omitted, because they are identical to controls in the steps S1 to S10 in the above first embodiment.

Also according to the present embodiment, functions and advantages similar to those in the above first embodiment can be obtained.

Further, the air-conditioner 1 can operate the economical heating operation in addition to the normal heating operation. In the economical heating operation, the radiant heating device 10 is operated based on operated states of the operational panels 30 when a passenger A is seated on the rear seat 8, and the radiant heating device 10 is not operated when no passenger A is seated on the rear seat 8. Therefore, since the radiant heating device 10 is not operated for the rear seats 8 on which no passenger A is seated, it saves energy (become economical).

(Modified Example of Radiant Heater)

Figure 12:
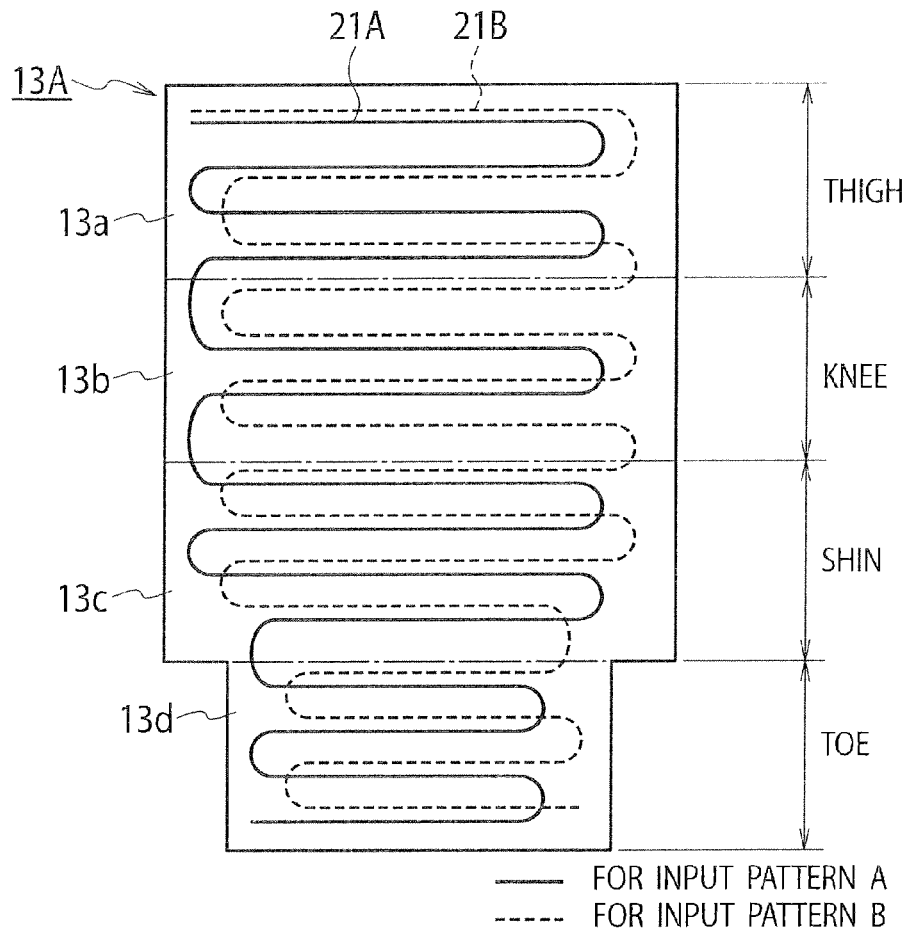
FIG. 12 It is an explanatory diagram showing electric heating wire patterns of a first electric heating pad in a modified example.

A modified example of the radiant heater 11 will be explained with reference to FIGS. 12 and 13. In this modified example, electric heating wire patterns of the radiant heater 11 are distinctively characterized. FIG. 12 shows electric heating wire patterns of a first electric heating pad 13A, and FIG. 13 shows electric heating wire patterns of a second electric heating pad 14A.

Figure 13:
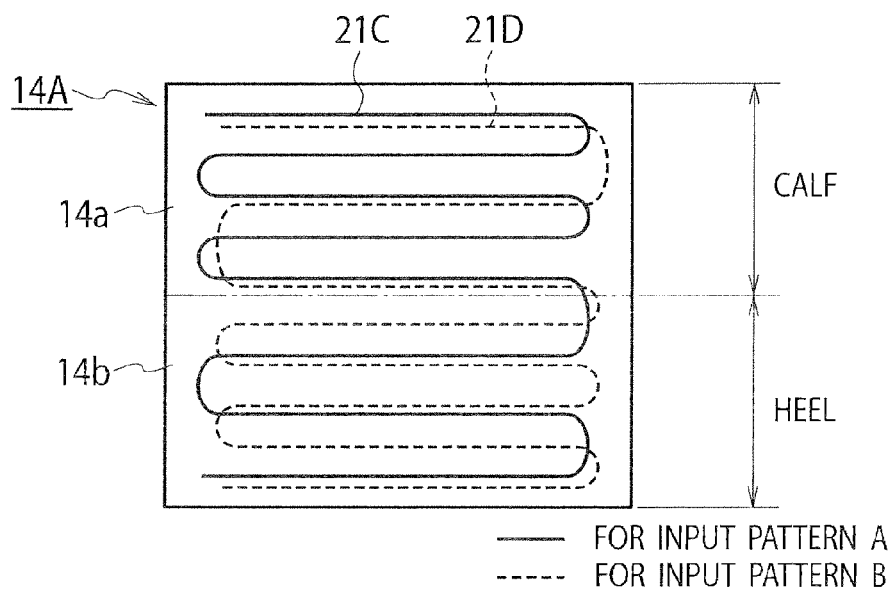
FIG. 13 It is an explanatory diagram showing electric heating wire patterns of a second electric heating pad in the modified example.
Figure 14:
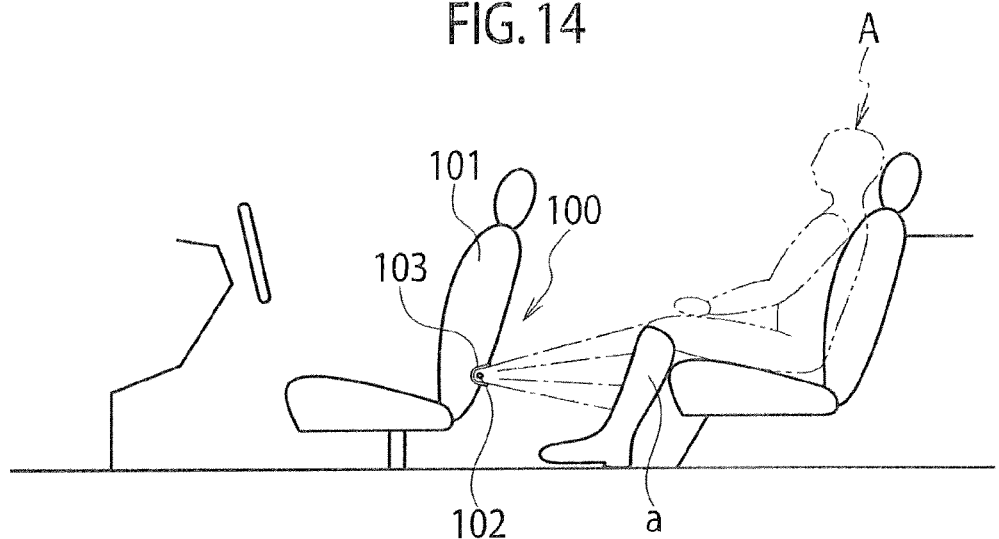
FIG. 14 It is a side view of a passenger compartment showing an installed state of a prior-art radiant heater.
Figure 15:
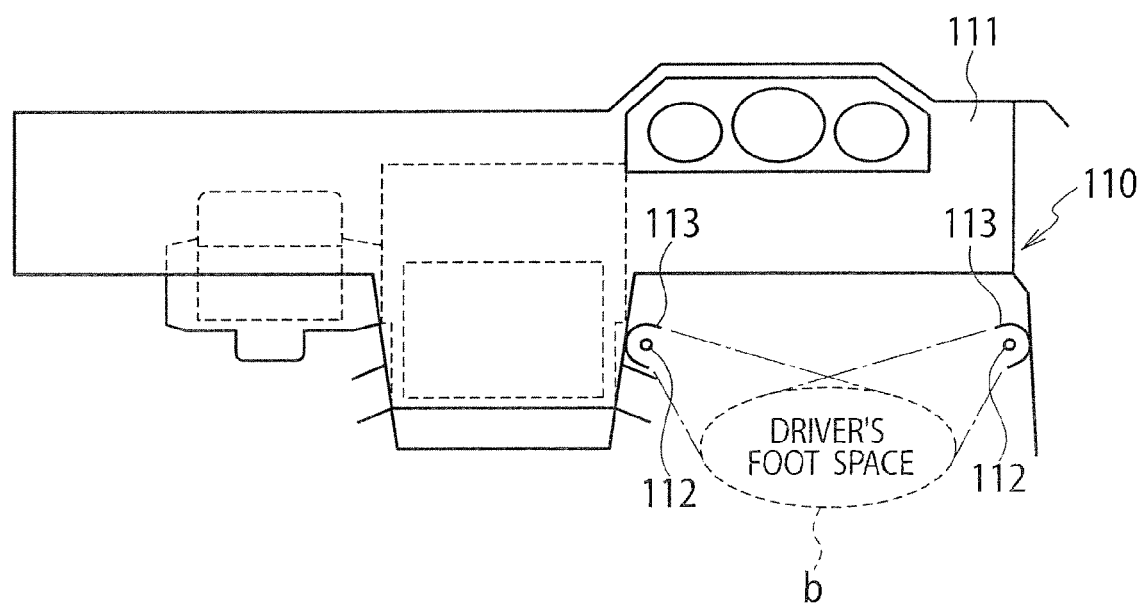
FIG. 15 It is an elevation view of a passenger compartment showing an installed state of another prior-art radiant heater.
Figure 16:
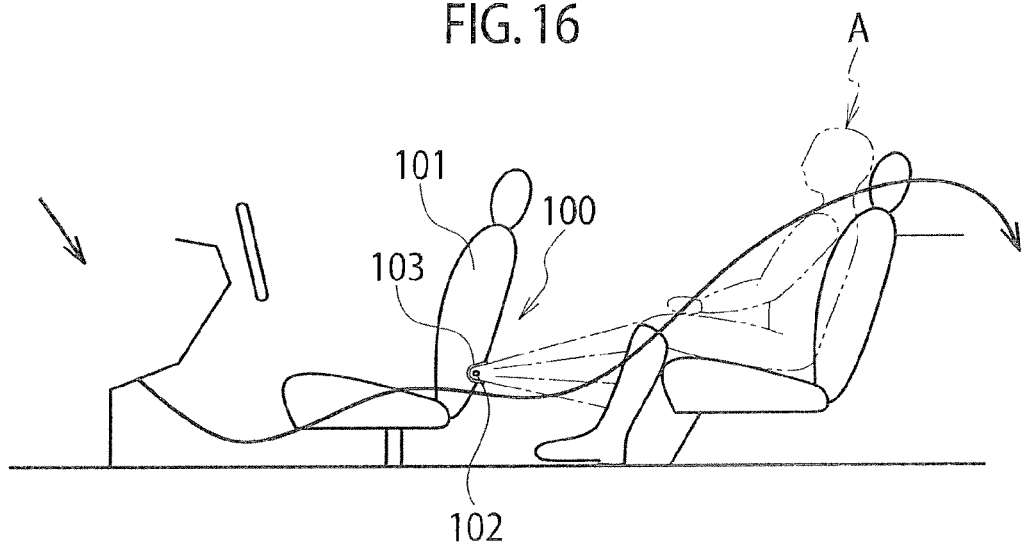
FIG. 16 It is a side view showing a heated airflow in an outside air intake mode in a prior art.
Figure 17:
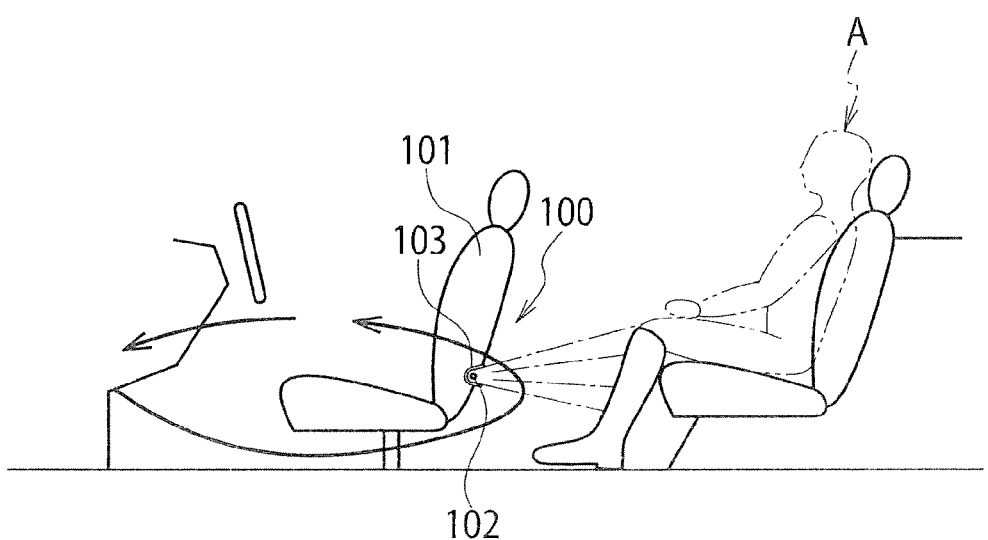
FIG. 17 It is a side view showing a heated airflow in an inside air intake mode in the prior art.

As shown in FIGS. 12 and 13, the first electric heating pad 13A includes an electric heating wire 21A patterned for the input pattern A and an electric heating wire 21B patterned for the input pattern B. The second electric heating pad 14A includes an electric heating wire 21C patterned for the input pattern A and an electric heating wire 21D patterned for the input pattern B. In addition, a third electric heating pad (15) and a fourth electric heating pad (16) also includes an electric heating wire patterned for the input pattern A and an electric heating wire patterned for the input pattern B, respectively. Then, the electric heating wires 21A, 21C and so on patterned for the input pattern A are energized in the outside air intake mode (with the input pattern A), and the electric heating wires 21B, 21D and so on patterned for the input pattern B are energized in the inside air intake mode (with the input pattern B).

Each of the electric heating pads 13A, 14A, (15) and (16) includes the plural patterns of the electric heating wires 21A to 21D and so on, radiant energy amounts of the electric heating pads 13A, 14A, (15) and (16) can be easily adjusted by changing over energization to the plural patterns of the electric heating wires 21A to 21D and so on.

Note that, although the radiant heating device 10 is configured to warm a passenger(s) A on the rear seat(s) 8 in the above first and second embodiments, it may be configured to warm a passenger(s) B on the front seat(s) 7.

The invention claimed is:

1. A radiant heating device for a vehicle, comprising:
a radiant heater that is provided together with an air-conditioner and radiates radiant heat toward a passenger, the air-conditioner selectively introducing air outside a passenger compartment or air inside the passenger compartment and then supplying conditioned air generated from the introduced air into the passenger compartment,
wherein the radiant heating device includes a controller that controls a radiant energy amount of the radiant heater by differentiating between when the introduced air into the air-conditioner is the air outside the passenger compartment and when the introduced air is the air inside the passenger compartment.

2. The radiant heating device according to claim 1, wherein the radiant heater includes a plurality of heating sections that radiate heat toward regions of the passenger, respectively.

3. The radiant heating device according to claim 2, wherein the controller adjusts radiant energy amounts of the plurality of heating sections based on when the introduced air into the air-conditioner is the air outside the passenger compartment and when the introduced air is the air inside the passenger compartment.

4. The radiant heating device according to claim 3, wherein one of the plurality of heating sections radiates radiant heat toward knees of the passenger.

5. The radiant heating device according to claim 3, wherein one of the plurality of heating sections radiates radiant heat toward calves of the passenger.

6. The radiant heating device according to claim 3, wherein one of the plurality of heating sections radiates radiant heat toward thighs of the passenger.

7. The radiant heating device according to claim 3, wherein the plurality of heating sections radiate radiant heat toward thighs, knees, shins, toes, calves, heels, a thigh-sideface and an ankle-sideface of the passenger, respectively.

8. The radiant heating device according to claim 1, wherein the radiant heater radiates radiant heat toward the passenger on a rear seat.

9. The radiant heating device according to claim 1, further comprising an operational panel for operating the radiant heater.

10. The radiant heating device according to claim 9, wherein
the operational panel includes an adjustment switch configured to adjust a radiant energy amount of the radiant heater.

11. The radiant heating device according to claim 9, wherein
the operational panel includes a switch configured to set a radiant energy amount of the radiant heater to a maximum amount.

12. The radiant heating device according to claim 1, wherein
the air-conditioner is configured to perform a normal heating operation and an economical heating operation, and
the controller, in the economical heating operation, operates the radiant heater when a passenger is seated on a rear seat, and does not operate the radiant heater when a rear seat is unoccupied.

13. The radiant heating device according claim 2, wherein
the controller controls a radiant energy amount of the radiant heater by a pulse width modulation control.

14. The radiant heating device according to claim 2, wherein
the radiant heater includes a plurality of electric heating wires having different patterns, and
the controller adjusts a radiant energy amount of the radiant heater by changing over energization to the electric heating wires.

15. A radiant heating device for a vehicle, comprising:
a radiant heater configured to provide radiant heat toward a passenger, and
a controller configured to control a radiant energy amount emitted from the radiant heater, the controller configured to receive an input signal differentiating between a first air intake mode where air is introduced into a passenger compartment from outside the passenger compartment and a second air intake mode where the air is from inside the passenger compartment,
wherein the controller is configured to adjust the radiant energy amount emitted from the radiant heater differently according to the input signal representing the first air intake mode or the second air intake mode.

* * * * *